(12) United States Patent
Kronrod et al.

(10) Patent No.: US 9,130,753 B1
(45) Date of Patent: Sep. 8, 2015

(54) AUTHENTICATION USING SECURITY DEVICE WITH ELECTRONIC INTERFACE

(71) Applicant: EMC Corporation, Hopkinton, MA (US)

(72) Inventors: Boris Kronrod, Netanya (IL); Yedidya Dotan, Newton, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 13/803,567

(22) Filed: Mar. 14, 2013

(51) Int. Cl.
*H04L 29/06* (2006.01)
*H04L 9/30* (2006.01)
*H04L 9/32* (2006.01)

(52) U.S. Cl.
CPC ............... *H04L 9/30* (2013.01); *H04L 9/3234* (2013.01); *H04L 63/0853* (2013.01)

(58) Field of Classification Search
None
See application file for complete search history.

(56) References Cited

U.S. PATENT DOCUMENTS

| | | | |
|---|---|---|---|
| 2004/0187012 A1* | 9/2004 | Kohiyama et al. | 713/193 |
| 2006/0174104 A1* | 8/2006 | Crichton et al. | 713/155 |
| 2007/0067634 A1* | 3/2007 | Siegler | 713/171 |
| 2009/0300738 A1* | 12/2009 | Dewe et al. | 726/6 |
| 2012/0108295 A1* | 5/2012 | Schell et al. | 455/558 |
| 2013/0085944 A1* | 4/2013 | Fielder | 705/67 |
| 2014/0025946 A1* | 1/2014 | Kim et al. | 713/156 |

OTHER PUBLICATIONS

"RSA SECURID® Authenticators," RSA Data Sheet, EMC Corporation, 2011, dowloaded from http://www.rsa.com/products/securid/datasheets/2305_h9061-sid-ds-0212.pdf, downloaded on Apr. 11, 2103, 4 pages.
"RSA SecurID Software Authenticators," EMC Corporation, 2013, downloaded from http://www.emc.com/security/rsa-securid/rsa-securid-software-authenticators/ms-windows.htm, downloaded on Apr. 11, 2013, 2 pages.
"Security Token," Wikipedia, downloaded from http://en.wikipedia.org/wiki/Security_token#Audio_Jack_port_28TRRS.29, downloaded on Apr. 11, 2013, 1 page.
"RSA SecurID® 800 Authenticator," RSA Security Inc., 2005-2009, downloaded from http://www.rsa.com/products/securid/datasheets/9651_SID800_DS_1109.pdf, downloaded on Apr. 11, 2013, 2 pages.
Foresman, "Project HiJack Uses iPhone Audio Jack to Make Cheap Sensors," Infinite Loop/The Apple Ecosystem, arstechnica, Jan. 14, 2011, retrieved from http://arstechnica.com/apple/2011/01/project-hijack-uses-iphone-audio-jack-to-make-cheap-sensors/, retrieved on Apr. 11, 2013, 1 page.

* cited by examiner

*Primary Examiner* — Harunur Rashid
*Assistant Examiner* — Andrew Steinle
(74) *Attorney, Agent, or Firm* — BainwoodHuang (57) ABSTRACT

An authentication technique employs a security device that communicates with a software token construct installed on a user device via a connector. The technique includes secure provisioning of an authentication seed and safe storage of the seed in encrypted form on the user device. A key for decrypting the seed is stored within the security device, and token codes are generated by physically connecting the security device to the user device and conveying the encrypted seed from the user device to the security device over the connector.

21 Claims, 5 Drawing Sheets

AUTHENTICATION USING SECURITY DEVICE WITH ELECTRONIC INTERFACE

BACKGROUND

Organizations that employ computer resources commonly require users to authenticate their identities before the organizations grant the employees access to the resources. For example, a company may require its employees to logon to an authentication server and enter credentials, such as usernames, passwords, and/or PINs (Personal Identification Numbers). The authentication server grants access only if it can verify the credentials.

Many organizations require users to enter token codes in addition to other credentials. For example, a company may issue its employees hardware tokens. Hardware tokens are generally simple devices, which have no network connections and cannot run user software. Hardware tokens automatically generate and display token codes at regular intervals, such as once per minute. The token codes produced by a hardware token may be based on a unique seed (e.g., a 256-bit value) which has been provisioned to the hardware token and thus to the specific user to whom the token is issued. The hardware token is typically a portable device (e.g., a key fob), which includes a timer and applies an algorithm to update the token code each time the timer expires. At the authentication server, the same seed is maintained, and the authentication server may apply the same or an equivalent algorithm as is applied on the hardware token, such that the token code produced by the authentication server can track the token codes produced by the hardware token. An example of a hardware token is the SecurID®, which is available from RSA The Security Division of EMC, of Bedford, Mass.

Organizations may also issue software tokens. Software tokens are programs that can be run on user devices, such as laptops, smart phones, or tablet computers, for example. Software tokens and hardware tokens work in similar ways, except that software tokens run on user devices and thus do not require special hardware.

To perform authentication with a token (either a hardware token or a software token), a user may be directed to a login screen, where the user is prompted to enter a user ID, the currently displayed token code, and (optionally) other credentials. The user then submits an authentication request, which sends the entered credentials to the authentication server. The authentication server receives the authentication request and computes an expected value of the token code, based on the seed it stores for the received user ID and the time. If the expected value of the token code matches the token code received from the user, and any other supplied credentials are verified, then the authentication server may grant the user access to the organization's resources. Otherwise, the authentication server may deny access.

SUMMARY

Unfortunately, provisioning seeds to hardware tokens can be inconvenient. For example, a typical provisioning process may require a user to appear in person before a network administrator of an organization and identify himself or herself to the administrator through suitable documentation. The administrator may then assign a unique seed to the user and configure a new hardware token with the new seed. The administrator updates a seed record on the authentication server to identify the user as the owner of the seed, so that the authentication server is later able to match the user with the user's seed and therefore reproduce the token codes of the user's hardware token when the user attempts to log on.

Software tokens are usually much simpler to provision. For example, a user may download a software token to a user device as a software program or mobile app. The user may then run a provisioning procedure on the token. During the procedure, secure communications are established over a network with the authentication server and the seed is sent to the user's device. The procedure automatically updates the seed record on the authentication server to associate the user with the newly provisioned seed.

Although software tokens are usually much more convenient to provision than hardware tokens, they are also typically less secure. As software tokens run in the software environments of the user devices which contain them, software tokens can sometimes be vulnerable to attack from viruses and other malware. It would be desirable to provide a token with both the security of a hardware token and the ease of provisioning of a software token.

In contrast with the prior approaches, an improved authentication technique employs a security device that communicates with a software token construct installed on a user device via a connector. The software token construct engages in a secure protocol with an authentication server to obtain a newly provisioned seed. The security device is connected to the user device via the connector, and the seed is transmitted over the connector to the security device, where the seed is encrypted and sent back to the user device over the connector for storage. The user device stores the encrypted seed, but does not have access to the encryption key, which is held inaccessibly within the security device. When a user wishes to submit an authentication request, the user connects the security device to the user device. The user device then sends the encrypted seed to the security device over the connector. The security device decrypts the seed and generates a new token code based at least in part on the decrypted seed. In this manner, the user device stores the seed in encrypted form, without access to the encryption key, and is resistant to malicious attacks. Thus, the improved technique provides both the ease of provisioning of software tokens and the security of hardware tokens.

In an example, each security device is provided with a unique encryption key, which can be used reversibly both to encrypt the provisioned seed and to decrypt the encrypted seed. Although the key on each security device is preferably unique, it need not be associated with any particular user. Thus, security device can be distributed by any suitable means, such as via retail stores or postal service, for example, without regard to the identity of the user obtaining the security device. Once a provisioned seed is encrypted by a security device, however, the seed becomes bound to the security device, as only the security device that encrypted the seed can also decrypt the seed and therefore use the seed to generate valid token codes.

Certain embodiments are directed to a method of authenticating a user to a computing resource. The method includes receiving, by a security device, an encrypted authentication seed from a user device over a connector connected between the security device and the user device. The method further includes decrypting, by the security device, the encrypted authentication seed received over the connector, and generating, by the security device, a token code based at least in part on the decrypted authentication seed, the token code providing at least one authentication factor for authenticating the user to the computing resource.

Other embodiments are directed to computerized apparatus and computer program products. Some embodiments involve activity that is performed at a single location, while other embodiments involve activity that is distributed over a computerized environment (e.g., over a network).

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same parts throughout the different views. The drawings are not necessarily to scale, emphasis instead being placed upon illustrating the principles of various embodiments of the invention. In the accompanying drawings.

DETAILED DESCRIPTION OF THE INVENTION

Embodiments of the invention will now be described. It is understood that such embodiments are provided by way of example to illustrate various features and principles of the invention, and that the invention hereof is broader than the specific example embodiments disclosed.

An improved technique for user authentication employs a security device that communicates with a software token construct installed on a user device via a connector.

Figure 1:
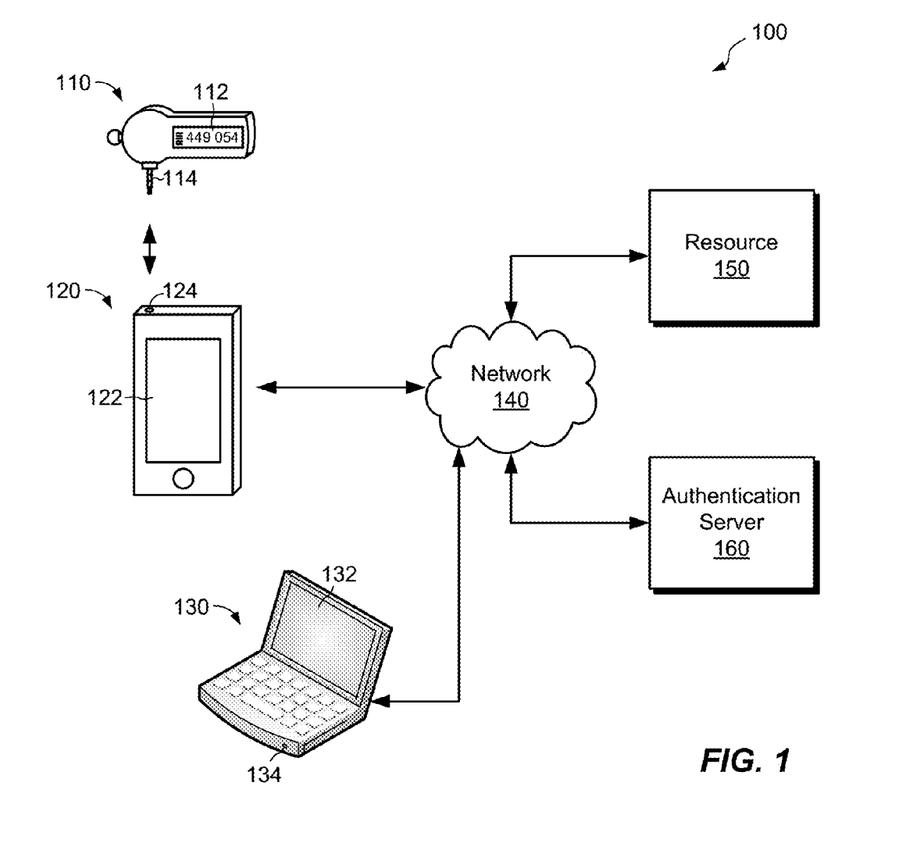
FIG. 1 is a block diagram showing an example environment in which authentication techniques hereof can be practiced.

FIG. 1 shows an example environment 100 in which embodiments of the improved technique hereof can be practiced. As shown in FIG. 1, the example environment 100 includes a security device 110, a user device 120, a computer 130, a network 140, a resource 150, and an authentication server 160.

In an example, the security device 110 is a portable device, such as a key fob, which may be realized in the form of a specialized hardware token. The security device 110 includes a display 112 (optionally) and a connector 114. The security device 110 stores an encryption key. Preferably, the encryption key is a symmetric key, which can be used both for encrypting plain text and for decrypting ciphertext. The encryption key is preferably unique to the security device 110, i.e., different security devices are provided with different encryption keys. In an example, the encryption key is established in the security device 110 when the security device 110 is manufactured. Also, the encryption key is stored in the security device 110 in such a way that it cannot be accessed from the outside or through the connector 114.

In an example, the connector 114 is a 4-conductor 3.5 mm TRSS phone plug. Although other types of connectors may be used, including, for example, other types of phone plugs, USB connectors, mobile device "dock" connectors, and other connectors, it is observed that a wide range of user devices across many different manufacturers and models include a 4-conductor 3.5 mm TRSS phone jack (i.e., the mate to the phone plug). Thus, the 4-conductor 3.5 mm TRSS phone plug provides a nearly ubiquitous and universal connector that can be used with a myriad of user devices. Although the connector 114 is shown as a plug (male connector), it is evident that the connector 114 may also be provided as a socket (female connector). However, the use of a socket for the connector 114 may necessitate the use of an adapter for connecting to most user devices.

The user device 120 includes a display 122 and a connector 124. In an example, the connector 124 on the user device 120 is constructed to mate with the connector 114 on the security device 110. Thus, where the connector 114 is a 4-conductor 3.5 mm TRSS phone plug, the connector 124 may be provided as a 4-conductor 3.5 mm TRSS phone jack. Of course, adapters may be used, and the ability of the connectors 114 and 124 to mate is not strictly required; however, it is strongly preferred.

The user device 120 can be any type of computing device having a connector 124, such as a smart phone, PDA, tablet computer, laptop computer, or desktop computer, for example. The user device 120 is configured to run software applications (e.g., programs or apps), which may be downloaded, for example, from on-line shopping sites or application stores, or installed via media directly onto the user device 120. Here, the user device 120 runs a software token construct, which may be provided as a program or app.

The computer 130 may be used in some but not all use cases. For example, a user may wish to access the resource 150 using the computer 130, in which case the user may employ the security device 110 and user device 120 to generate a token code, which the user may enter manually into a login screen displayed on a screen 132 of the computer 130. In other use cases, the user may wish to access the resource 150 directly from the user device 120, in which case no computer 130 is required. It is noted that the computer 130 is seen to include a connector 134, e.g., a 4-conductor 3.5 mm TRSS phone jack. The connector 134 is shown merely to illustrate that the computer 130 may itself be configured as the user device 120.

The network 140 includes wireless and/or wired network components, to support connection of the user device 120 and the computer 130 to the resource 150 and the authentication server 160, e.g., via the Internet. The network 140 may also include cellular telephone network components, wireless data network components, and/or other network components, for example.

The resource 150 may include any data collection, network, server, and/or other computer asset that can be accessed via user authentication. Particular examples of the resource 150 may include banking applications, stock trading sites, and corporate intranets, for example.

The authentication server 160 operates to restrict access to the resource 150 by requiring users to prove their identities. To this end, the authentication server 160 may require users to enter their user IDs and token codes. Other authentication factors may be required, as well, such as PINs and/or passwords, for example. Users are granted access to the resource 150 only if the authentication server 160 can verify the supplied authentication factors. In order to test authentication factors, the authentication server 160 generally includes, or has access to, one or more databases that associate particular user IDs with respective token code seeds, as well as passwords, PINs and any other authentication factors. The authentication server 160 may also have the capability to execute security algorithms to compute expected token code values of any user based on the seed provisioned to the user and the current time. The security algorithms may also include additional factors in the computation of expected token codes, such as transaction data related to any transaction that the user is attempting to conduct with the resource 150, for example.

In an example, the authentication server 160 also performs the task of provisioning token code seeds to users. For instance, the authentication server 160 participates in secure communications with software token constructs on user devices to securely provision token code seeds to particular users. The authentication server 160 may include or have access to a seed record, which associates each provisioned seed with a respective user ID. In an alternative arrangement, the task of provisioning seeds is performed by a separate provisioning server. Any such provisioning server is considered herein to be part of the authentication server 160. It is understood that the authentication server 160 may be implemented on any number of physical computers.

In operation, the user device 120 obtains an authentication seed from the authentication server 160 and works in cooperation with the security device 110 to generate token codes for user authentication. To acquire a seed, a user may launch the software token construct on the user device 120 and issue a command. In response to the command, the software token construct directs the user to physically plug the security device 110 into the user device 120, i.e., to mate the connector 114 with the connector 124. The software token construct then initiates a secure session with the authentication server 160 over the network 140. The software token construct sends the authentication server 160 the user ID of the user, as well as other factors to uniquely identify the user. The authentication server 160 then provisions a seed, updates its seed record with the user's user ID, and sends the newly provisioned seed to the user device 120. In an example, the seed is a unique 256-bit value.

The user device 120 preferably does not store the newly provisioned seed, but rather immediately transmits the seed over the mated connectors 114/124 to the security device 110. The user device 120 then promptly deletes the seed, so as to remove all traces of the seed from the user device 120 and thus to thwart any malicious attackers.

Upon receiving the seed over the connectors 114/124, the security device 110 encrypts the seed with the encryption key and sends the encrypted seed, again over the connectors 114/124, to the user device 120. The user device then stores the encrypted seed in its memory (e.g., in non-volatile memory for long-term storage). The software token construct may then direct the user to disconnect the security device 110 from the user device 120 (separate the connectors 114 and 124), as provisioning has been completed.

Although the user device 120 stores the encrypted seed, it preferably does not store the encryption key. Thus, the encrypted seed is meaningless to the user device 120 as well as to any attackers of the user device 120. Indeed, it is necessary only for the security device 110 to store the encryption key. The encryption key need not be stored anywhere else, e.g., not at the authentication server 160 nor even at the factory that manufactured the security device 110.

With provisioning complete, the user may wish to access the resource 150 over the network 140. In an example, the user may operate the user device 120 to perform an online transaction involving the resource 150. The transaction may be any type of transaction, such as a bank transaction, an online purchase, or an attempt to access a corporate intranet, for example. As part of the transaction, the user is prompted to authenticate to a resource (e.g., the resource 150). The user may launch the software token construct, or the software token construct may be accessed automatically. The software token construct then directs the user to physically plug the security device 110 into the user device 120 (i.e., to mate the connectors 114 and 124). The software token construct then fetches the encrypted seed from its memory and sends the encrypted seed over the connectors 114/124 to the security device 110. The user device 120 may send additional information to the security device 110, as well, such as a user PIN, the current time (e.g., a timestamp) and/or transaction data. The security device 110 decrypts the encrypted seed, using the encryption key, and generates a new token code based on the seed, the current time, and any additional information supplied.

The security device may then output the newly generated token code in a variety of ways. In one example, the security device 110 outputs the token code by displaying it on its display 112. The user then reads the display 112 and manually transcribes the token code to a data entry field on the user device 120. In another example, the security device 110 sends the token code to the user device 120 electronically over the connectors 114/124, such that no manual data entry is required. Where the security device 110 is designed to output token codes via the connectors 114/124, the security device 110 may be provided without a display 112.

In an example, the transaction data relates to the current transaction being conducted by the user device 120 in connection with the resource 150. For example, if the transaction relates to an online purchase, the transaction data may include the price of the item sought to be purchased. The transaction data may be sent to the security device 110 along with the encrypted seed (and PIN, if one is supplied) and used as input for generating the token code. Different transaction data (and PINs) will thus result in the generation of different token codes, even for the same seed and the same time. It is evident that any such transaction data used in generating a token code must also be available to the authentication server 150, so that the authentication server 150 can generate a token code that matches the token code generated by the security device 110.

The use case described above assumes that the user conducts the transaction with the user device 120. However, the user may instead use the computer 130 to conduct the transaction. Assuming that the computer 130 does not itself run a software token construct (i.e., that it is not itself a "user device"), the user may still operate the software token construct on the user device 120 with the security device 110 to generate a new token code substantially as described above. The new token code, once generated on the security device 110, may be displayed on the display 112 or transmitted electronically over the connectors 114/124 and displayed on the user device 120. The user may then manually transcribe the displayed token code into a data entry field displayed on the screen 132 of the computer 130 and proceed to submit an authentication request. As the security device 110 and user device 120 generate the token code independently of the computer 130 in this use case, the token code will generally not be calculated based on transaction data. However, it is possible (although less convenient) to request that the user plug the security device 110 into the computer 130 (i.e., at the connector 134) to obtain transaction data from the computer 130, which the security device 110 may then use as input in generating the token code.

In an example, when transmitting the seed from the user device 120 to the security device the first time (when provisioning), the user device 120 first encrypts the seed with a public key supplied with the software token construct. This way, the software token construct avoids exposing the seed at the connectors 114 and 124 in the clear. In addition to storing the encryption key, the security device 110 may also store a private key that is paired with the public key, so that the security device can decrypt the seed received from the user device 120 before encrypting it again using the symmetric encryption key.

The improved technique is thus both convenient and highly secure. It provides the convenience of software tokens, while enhancing their security through the use of the security device 110. Security devices 110 can be manufactured without registration or provisioning and are thus also simple to distribute and administer.

Figure 2:
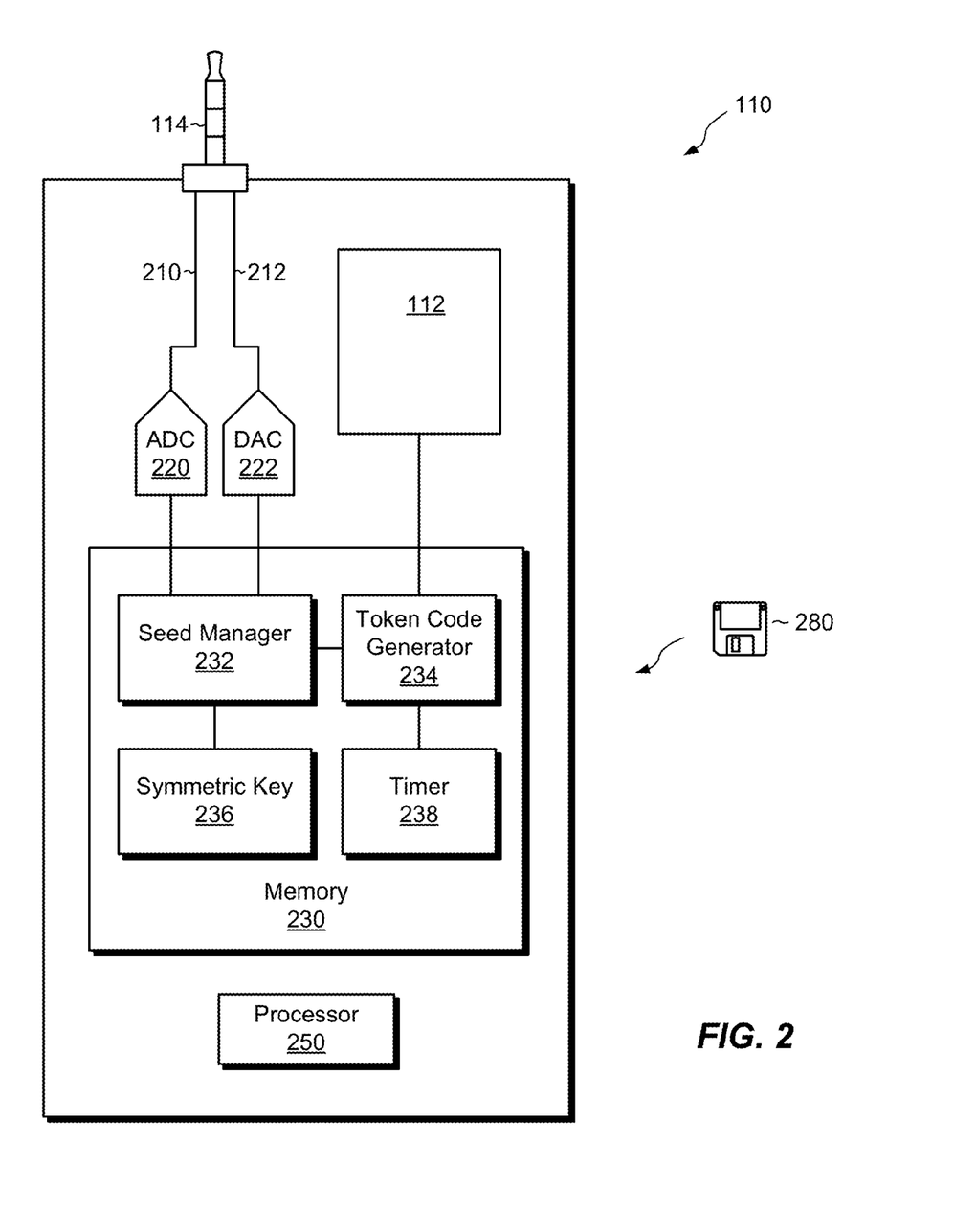
FIG. 2 is a block diagram showing an example design of a security device of FIG. 1.

FIG. 2 shows an example security device 110 in greater detail. Here, it is seen that the security device 110 includes, in addition to the elements already described, a first conductor 210, a second conductor 212, an analog-to-digital converter (ADC) 220, a digital-to-analog converter (DAC) 222, memory 230, and a processor 250. The memory 230 includes both volatile memory (e.g., RAM) and non-volatile memory (e.g., ROM or flash memory). The memory 230 includes a seed manager 232, a token code generator 234, a timer 238, and a symmetric key 236, e.g., a factory-assigned encryption key unique to the security device 110.

The connector 114 includes various electrical contacts, which are separated within the security device 110 into paths 210 and 212. Path 210 carries analog signals received from the connector 114 (e.g., from the audio output of the user device 120) to the ADC 220. Path 212 carries analog signals to the connector 114 (e.g., to the audio input of the user device 120) from the DAC 222.

In operation, the ADC 220 receives transmissions from the user device 120 over the connector 214 and via the path 210 in the form of analog signals (e.g., audio-band signals), which convey, in analog form, the seed (during provisioning) as well as the encrypted seed and, if provided, the PIN, timestamp, and transaction data (during transactions). The analog signals may be varied according to any suitable protocol to transmit the desired data. In one example, an analog signal takes the shape of a rectangular waveform, which varies over time to provide a serial bit stream. The ADC 220 may measure the bit stream by discrete-time sampling to generate a digital representation of the bit stream. The bit stream is then sent to the seed manager 232 for decoding and processing. In another example, the analog signal is provided as a sequence of tones, similar to the tones produced by a modem. The ADC 220 samples the tones and provides the resulting digital values to the seed manager 232, which decodes and processes them.

To send data (e.g., the encrypted seed and generated token codes) to the user device 120, the seed manager 232 formats the data according to the desired protocol to produce a sequence of digital values. The DAC 222 converts the digital values to a time-varying analog signal, which it conveys over the path 212 to the connector 114. The user device 120 may then receive and decode the analog signal.

During provisioning, the seed manager 232 receives the seed (either in the clear or encrypted with a public key) via the ADC 220. If the seed is encrypted with a public key, the seed manager 232 applies a private key to decrypt the seed. The seed manager then encrypts the seed with the symmetric key 236 and sends the encrypted seed, via the DAC 222, to the connector 114 and on to the user device 120 for storage.

During transactions, the seed manager 232 receives the encrypted seed via the ADC 220 and decrypts the encrypted seed with the symmetric key 236. The seed manager 232 may also receive additional information, such as a user PIN, a timestamp, and/or transaction data. The seed manager 232 passes the seed and the additional information to the token code generator 234, which generates a new token code based on the inputs it receives. The token code generator 234 may then send the newly generated token code to the display 112, for visual presentation to the user, and/or send the token code to the seed manager 232, for transmission via the DAC 222 to the connector 214, and on to the user device 120.

The timer 238 may operate to erase the token code from the display 112 after a designated period of time (e.g., 1 minute) has passed. Alternatively, the timer 238 prompts the token code generator 234 to generate new token codes, e.g., one per minute, based on the seed and other information it has received and the updated time. In an example, the token code generator 234 continues to generate new token codes as long as the security device 110 is plugged into the user device 120.

It is understood that the seed manager 232, token code generator 234, and timer 238 may be implemented as software constructs within the memory 230. The processor 250 and the memory 230 together form a specialized circuit that is constructed and arranged to carry out the various functions described. In alternative arrangements, the seed manager 232, token code generator 234, and timer 238 may be implemented with firmware, microcode, and/or as specialized hardware circuits.

Figure 3:
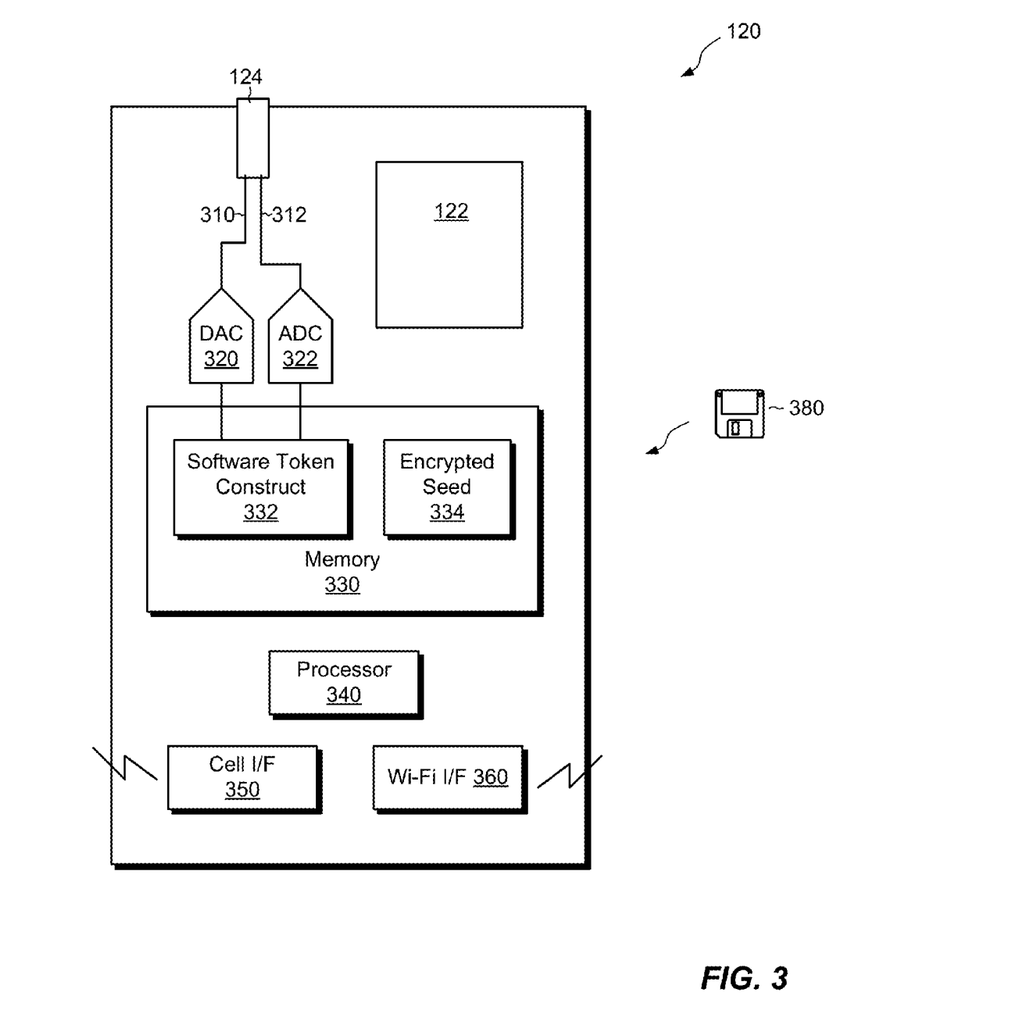
FIG. 3 is a block diagram showing an example design of a user device of FIG. 1.

FIG. 3 shows and example user device 120 in additional detail. Here, it is seen that the user device 120 includes, in addition to the elements already described, a first conductor 310, a second conductor 312, a digital-to-analog converter (DAC) 320, an analog-to-digital converter (ADC) 322, memory 330, and a processor 340. The memory 330 includes both volatile memory (e.g., RAM) and non-volatile memory (e.g., ROM, flash memory, and or disk drives). The user device 120 also includes a cell phone interface 350 and/or a Wi-Fi interface 360. The memory 330 includes a software token construct 332 and stores an encrypted seed 334, i.e., the seed that was encrypted by the security device 110. Preferably, the user device 120 stores the encrypted seed 334 in non-volatile memory.

The connector 124 includes various electrical contacts, which are separated within the user device 120 into paths 310 and 312. Path 310 carry analog signals from the DAC 320 to the connector 214 (e.g., to the audio output of the user device 120). Path 312 carry analog signals received from the connector 214 (e.g., from the audio input of the user device 120) to the ADC 322. It is understood that many examples of user devices (e.g., smart phones, PDAs, tablet computers, etc.) include, without modification, the DAC 320, ADC 322, paths 310 and 312, and connector 124, as these components form parts of the native audio hardware of these devices.

In operation, the software token construct 332 sends and receives data via the DAC 320 and ADC 322, respectively, over the connector 124. Data are conveyed over the connector 124 in analog form, according to the same protocol as is used by the security device 110. In an example, the software token construct 332 encodes digital values that it sends to the DAC 320, and decodes digital values that it receives from the ADC 322. Alternatively, the software token construct 332 operates in connection with a driver or other software construct (not shown), which runs on the user device 120 to encode and decode data exchanged over the connector 124 (e.g., over the audio jack).

During provisioning, the software token construct 332 may establish a secure communication session over the network 140 with the authentication server 160, e.g., via the cell interface 350 or the Wi-Fi interface 360. The software token construct 332 exchanges data with the authentication server 160 and obtains an authentication seed. The software token construct 332 sends the seed to the security device 110, which encrypts the seed and returns it to the software token construct 332. The software token construct 332 then stores the encrypted seed 334 in the memory 330.

During transactions, the software token construct 332 gathers data, such as the user's user ID, the current time, the user's PIN, and/or transaction data, and sends the data, along with the encrypted seed 334, to the security device 110. In some examples, the software token construct 332 receives back a token code (or a succession of token codes) calculated from the gathered data. In some examples, the software token construct 332 displays the token code on the display 122, e.g., to allow the user to transcribe the code to the computer 130. In other examples, the software token construct 332 automatically includes the token code in an authentication request that it sends to the authentication server 160.

Figure 4:
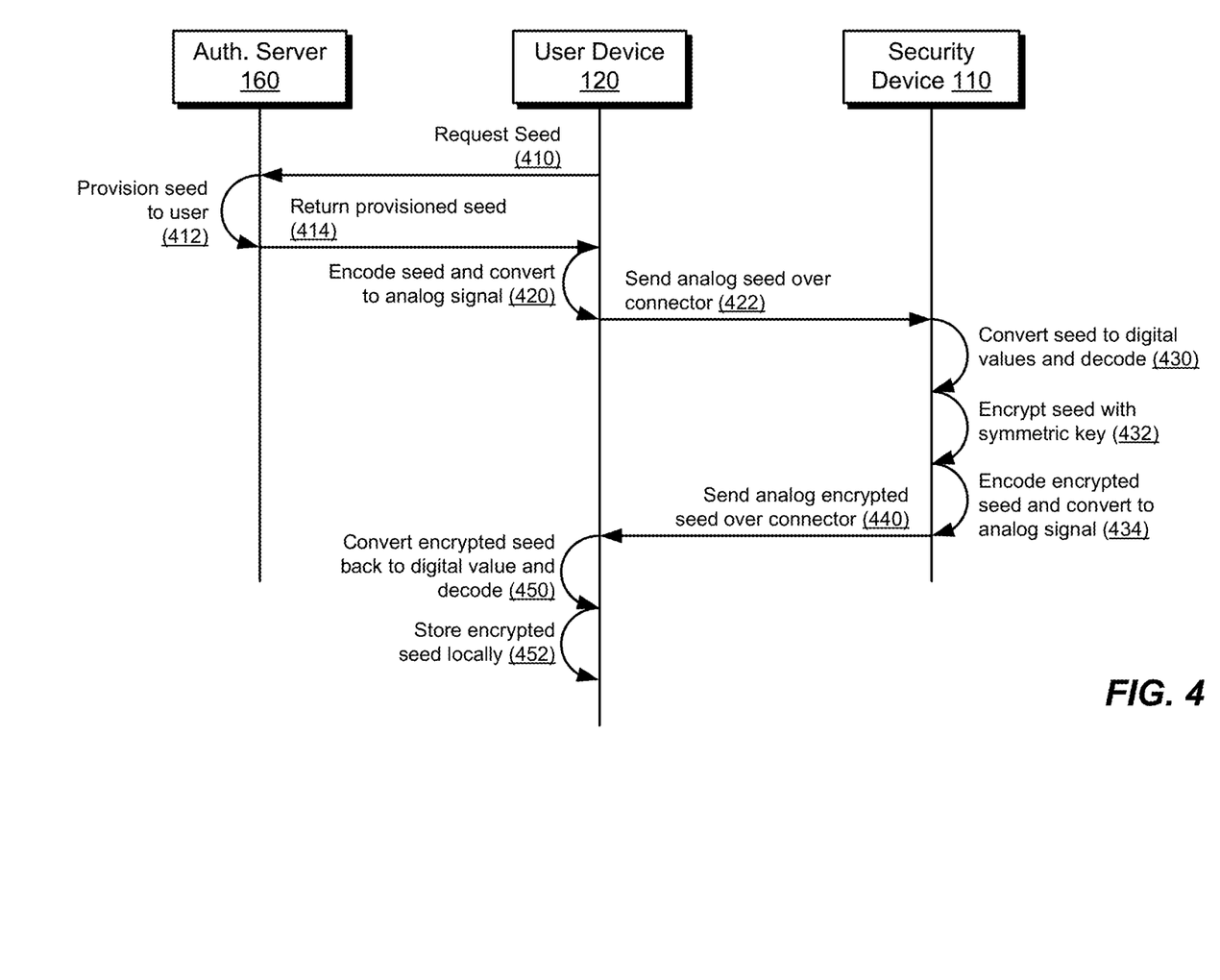
FIG. 4 is a sequence diagram showing an example provisioning process for obtaining an authentication seed.
Figure 5:
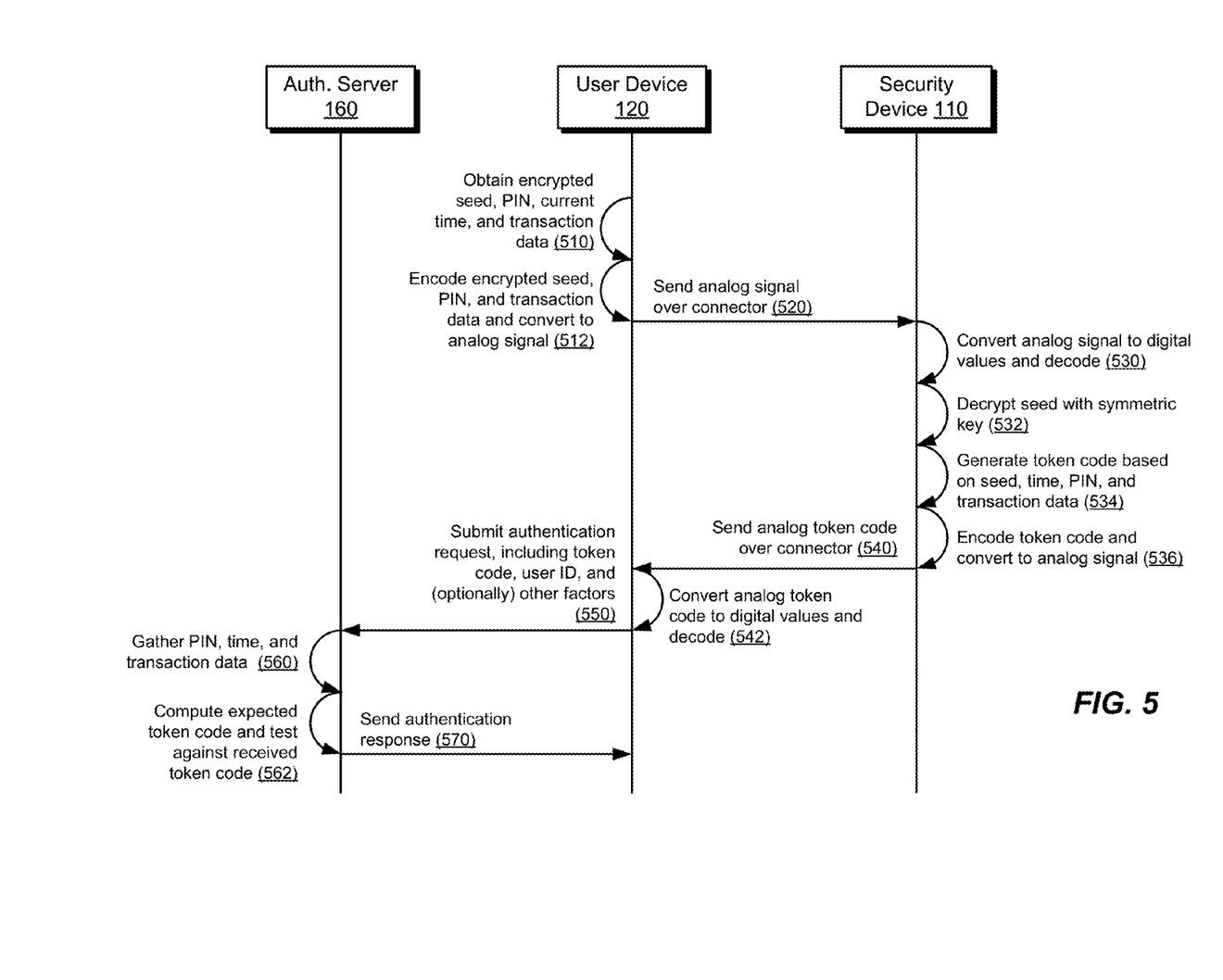
FIG. 5 is a sequence diagram showing an example process for authenticating a user to a resource using the authentication seed provisioned according to the process of FIG. 4.

FIGS. 4 and 5 illustrate processes that may be carried out in connection with the environment 100. The various acts of each process may be ordered in any suitable way. Accordingly, embodiments may be constructed in which acts are performed in orders different from those illustrated, which may include performing some acts simultaneously, even though the acts are shown as sequential in the illustrated embodiments.

FIG. 4 shows an example sequence of events for provisioning a seed to a user. At step 410, the user device 120 sends a request for a new seed to the authentication server 160. For example, the user may start the software token construct 332 and issue a command to obtain a new seed. The software token construct 332 may direct the user to plug the security device 110 into the user device 120. The software token construct 332 and the authentication server 160 then engage in secure communications, and data are exchanged to verify the identity of the user.

At step 412, the authentication server 160 provisions a new authentication seed to the user. For example, the authentication server 160 selects an unused seed from its seed record and updates the seed record to identify the user as the owner of the newly provisioned seed.

At step 414, while secure communications are still taking place, the authentication server 160 returns the newly provisioned seed to the user device 120. The secure communication session may then be closed.

At step 420, the user device 120 encodes the newly provisioned seed according to the selected communication protocol (e.g., serial bit stream, modem-style tones, etc.) and converts the result into an analog signal (e.g., via the DAC 320).

At step 422, the user device 120 sends the analog representation of the seed over the connector 124 to the security device 110. In some examples, prior to converting the seed to an analog signal, the user device 120 may encrypt the seed with a public key, to avoid sending the seed to the security device 110 in the clear. The security device 110 then receives the seed via the connector 114.

At step 430, the security device 110 converts the analog representation of the seed to digital values, e.g., via the ADC 220 and decodes received signal. If the seed was encrypted with a public key, the seed manager 232 within the security device 110 may decrypt the seed with a private key to render the seed as plaintext.

At step 432, the security device 110 encrypts the plaintext seed with the symmetric key 236. The security device 110 then encodes the encrypted seed according to the selected protocol and converts the result to an analog signal, e.g., via the DAC 232 (step 434).

At step 440, the security device 110 sends the analog representation of the encrypted seed over the mated connectors 114/124 to the user device 120. The user device 120 converts the analog representation of the encrypted seed to digital values (e.g., via the DAC 320) and decodes the digital values (step 450).

At step 452, the user device 120 stores the encrypted seed in its memory 330 (as the encrypted seed 334). At the conclusion of step 452, the seed is thus provisioned to the user and bound to the security device 110.

FIG. 5 shows an example sequence of events for generating a new token code, or a sequence of new token codes, during a transaction in which the user wishes to obtain access to the resource 150. At step 510, the user device 120 gathers information, including the encrypted seed 334, the current time (timestamp), and (optionally) the user's PIN and various transaction data.

At step 512, the user device 120 encodes the gathered information according to the selected protocol (e.g., serial bit streams, modem tones, etc.) and converts the encoded result into an analog signal (e.g., via the DAC 320). The software token construct 332 directs the user to connect the security device 110 to the user device 120.

At step 520, the user device sends the analog representation of the gathered information over the mated connectors 114/124 to the security device 110. The security device 110 then performs numerous operations. At step 530, the security device 110 converts the received analog representation to digital values and decodes the resulting values. At step 532, the security device 110 decrypts the received seed with the symmetric key 236. At step 534, the security device 110 generates a new token code based on the received seed and time, and optionally also based on the user's PIN and the transaction data. At step 536, the security device 110 encodes the generated token code according to the protocol and converts the encoded result to an analog signal representing the token code. At step 540, the security device 110 sends the analog representation of the token code to the user device 120 over the mated connectors 114/124.

At step 542, the user device 120 converts the received analog signal to digital values and decodes the digital values according to the protocol to obtain a numerical representation of the token code.

At step 550, the software token construct running on the user device 120 submits an authentication request to the authentication server 160. The authentication request includes the newly generated token code, the user ID and (optionally) other authentication factors.

At step 560, the authentication server 160 receives the authentication request and gathers information it needs to test the supplied authentication factors, e.g., the current time, the user's PIN, transaction data, and so forth.

At step 562, the authentication server 160 computes an expected token code (e.g., based on the user's seed, the current time, the PIN, and/or the transaction data) and compares the expected token code with the token code received in the authentication request. If the codes match, and any other authentication factors are verified, access to the resource 150 may be granted; otherwise, access may be denied.

At step 570, the authentication server 160 sends an authentication response to the user device 120, indicating whether authentication is granted or denied. The authentication server 160 may also communicate with the resource 150, to direct the resource either to allow or deny access to the user.

An improved authentication technique has been described that employs a security device 110 that communicates with a software token construct 332 installed on a user device 120 via a connector 114. The technique includes secure provisioning of an authentication seed and safe storage of the seed in encrypted form on the user device 120. A key 236 for decrypting the seed is stored inaccessibly within the security device 110, and token codes are generated by physically connecting the security device 110 to the user device 120 and conveying the encrypted seed from the user device 120 to the security device 110 over the connector.

As used throughout this document, the words "comprising," "including," and "having" are intended to set forth certain items, steps, elements, or aspects of something in an open-ended fashion. Although certain embodiments are disclosed herein, it is understood that these are provided by way of example only and the invention is not limited to these particular embodiments.

Having described certain embodiments, numerous alternative embodiments or variations can be made. For example, it has been shown and described that the encryption key is a symmetric key. This is merely an example, however. Alternatively, the security device 110 may be provided with multiple keys, e.g., one for encrypting the seed and another for decrypting the seed.

Further, although features are shown and described with reference to particular embodiments hereof, such features may be included in any of the disclosed embodiments and their variants. Thus, it is understood that features disclosed in connection with any embodiment can be included as variants of any other embodiment, whether such inclusion is made explicit herein or not.

Further still, the improvement or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like (shown by way of example as medium 280 and 380 in FIGS. 2 and 3). Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

Those skilled in the art will therefore understand that various changes in form and detail may be made to the embodiments disclosed herein without departing from the scope of the invention.

What is claimed is:

1. A method of authenticating a user to a computing resource, comprising:
receiving, by a security device, an encrypted authentication seed from a user device over a connector connected between the security device and the user device;
decrypting, by the security device, the encrypted authentication seed received over the connector; and
generating, by the security device, a token code based at least in part on the decrypted authentication seed, the token code providing at least one authentication factor for authenticating the user to the computing resource,
wherein decrypting the encrypted authentication seed is performed using a decryption key that differs from decryption keys assigned to multiple other security devices of like kind, such that the other security devices cannot decrypt the encrypted authentication seed using their decryption keys,
wherein the encrypted authentication seed is received over the connector as an analog electronic signal conveying the encrypted authentication seed, and
wherein the method further comprises—
rendering the analog electronic signal as a digital signal representing the encrypted authentication seed in digital form; and
transmitting the token code from the security device over the connector to the user device, wherein transmitting the token code includes (a) rendering the token code as an analog electronic signal and (b) conveying the analog electronic signal representing the token code to the user device via the connector.

2. The method of claim 1, further comprising, prior to receiving the encrypted authentication seed for authenticating the user to the computing resource, performing a provisioning operation, the provisioning operating including:
receiving the authentication seed from the user device over the connector connected between the security device and the user device;
encrypting, by the security device, the authentication seed using an encryption key that differs from encryption keys assigned to other security devices of like kind; and
transmitting, by the security device, the encrypted authentication seed to the user device over the connector.

3. The method of claim 2, wherein the encryption key and the decryption key are implemented together in a symmetric key stored in the security device, the symmetric key differing from symmetric keys assigned to other security devices of like kind.

4. The method of claim 3, wherein, when receiving the authentication seed during the provisioning operation, the authentication seed is encrypted with a public key, and wherein the method further comprises applying a private key stored in the security device to the received authentication seed to decrypt the authentication seed.

5. The method of claim 2, wherein encrypting the authentication seed binds the security device to the authentication seed so that no other security device can decrypt the encryption seed.

6. The method of claim 1, further comprising the security device receiving transaction data from the user device over the connector contemporaneously with receiving the encrypted authentication seed, the transaction data including information relative to an online transaction of the user device with a server that requires the user device to authenticate to the computing resource to complete the online transaction, wherein generating the token code is further based at least in part on the transaction data.

7. The method of claim 1, wherein the token code has a display, and wherein the method further comprises, after generating the token code, the security device displaying the token code on the display.

8. The method of claim 7, wherein the method further comprises, prior to the security device receiving the encrypted authentication seed from the user device, a software token construct that runs on the user device directing the user to plug the security device into the user device.

9. The method of claim 8, wherein the method further comprises, subsequent to the security device receiving the encrypted authentication seed from the user device, the software token construct running on the user device directing the user to disconnect the security device from the user device.

10. The method of claim 1, further comprising receiving, by the user, the security device via postal service.

11. The method of claim 10,
wherein the decryption key is established when the security device is manufactured and becomes a permanent part of the security device, and
wherein, when receiving the security device via postal service, the security device already includes the decryption key.

12. The method of claim 1, further comprising purchasing, by the user, the security device at a retail store.

13. The method of claim 1, wherein the decryption key is established in the security device when the security device is manufactured and becomes a permanent part of the security device.

14. The method of claim 13, wherein the decryption key cannot be accessed from outside the security device.

15. A plurality of security devices, each security device comprising:
- a connector;
- a set of processors coupled to the connector; and
- memory, coupled to the set of processors, the memory storing executable instructions, which when executed by the set of processors cause the set of processors to:
- receive an encrypted authentication seed from a user device over the connector;
- decrypt the encrypted authentication seed received over the connector by applying a decryption key that differs from decryption keys assigned to any other security device of the plurality of security devices, such that none of the other security devices can decrypt the encrypted authentication seed; and
- generate a token code based at least in part on the decrypted authentication seed, the token code providing at least one authentication factor for authenticating the user to the computing resource,
- wherein each of the plurality of security devices further comprises an analog-to-digital converter constructed and arranged to receive the encrypted authentication seed as an analog signal and to convert the analog signal to a digital signal representing the encrypted authentication seed in digital form, and
- wherein each of the plurality of security devices further comprises a digital-to-analog converter constructed and arranged to transmit the token code over the connector to the user device as an analog signal representing the token code in analog form.

16. The plurality of security devices of claim 15, wherein, the executable instructions, when executed by the set of processors, further cause the set of processors of each of the plurality of security devices to:
- receive the authentication seed from the user device over the connector during a provisioning operation;
- encrypt the authentication seed using an encryption key that differs from encryption keys assigned to any other security device of the plurality of security devices; and
- transmit the encrypted authentication seed to the user device over the connector.

17. The plurality of security devices of claim 15, wherein each of the plurality of security devices is provided as a key fob, and wherein the decryption key of each of the plurality of security devices is established in the respective security device when the security device is manufactured and becomes a permanent part of the respective security device.

18. A non-transitory computer readable medium including instructions which, when executed by a set of processors of a computing device, cause the set of processors to perform a method of authenticating a user to a computing resource, the method comprising:
- receiving, by a security device, an encrypted authentication seed from a user device over a connector connected between the security device and the user device;
- decrypting by the security device, the encrypted authentication seed received over the connector; and
- generating, by the security device, a token code based at least in part on the decrypted authentication seed, the token code providing at least one authentication factor for authenticating the user to the computing resource,
- wherein decrypting the encrypted authentication seed is performed using a decryption key that differs from decryption keys assigned to multiple other security devices of like kind, such that the other security devices cannot decrypt the encrypted authentication seed,
- wherein the encrypted authentication seed is received over the connector as an analog electronic signal conveying the encrypted authentication seed, and
- wherein the method further comprises—
  - rendering the analog electronic signal as a digital signal representing the encrypted authentication seed in digital form; and
  - transmitting the token code from the security device over the connector to the user device, wherein transmitting the token code includes (a) rendering the token code as an analog electronic signal and (b) conveying the analog electronic signal representing the token code to the user device via the connector.

19. The non-transitory computer readable medium of claim 18, wherein the method further comprises, prior to receiving the encrypted authentication seed for authenticating the user to the computing resource, performing a provisioning operation, the provisioning operating including:
- receiving the authentication seed from the user device over the connector connected between the security device and the user device;
- encrypting, by the security device, the authentication seed using an encryption key that differs from encryption keys assigned to other security devices of like kind;
- transmitting, by the security device, the encrypted authentication seed to the user device over the connector.

20. The non-transitory computer readable medium of claim 19, wherein the encryption key and the decryption key are implemented together in a symmetric key stored in the security device, the symmetric key differing from symmetric keys assigned to other security devices of like kind.

21. The non-transitory computer readable medium of claim 19, wherein, when receiving the authentication seed during the provisioning operation, the authentication seed arrives is encrypted with a public key, and wherein the method further comprises applying a private key stored in the security device to the received authentication seed to decrypt the authentication seed.

* * * * *